United States Patent
Cook et al.

(10) Patent No.: US 9,684,549 B1
(45) Date of Patent: Jun. 20, 2017

(54) EVENT MANAGEMENT ARCHITECTURE

(71) Applicant: Resources Connection, Inc., Irvine, CA (US)

(72) Inventors: Radgia Cook, San Rafael, CA (US); Todd Fletcher, New Orleans, LA (US); Gary Lee, Cary, NC (US)

(73) Assignee: Resources Connection, Inc., Irvine, CA (US)

( * ) Notice: Subject to any disclaimer, the term of this patent is extended or adjusted under 35 U.S.C. 154(b) by 0 days.

(21) Appl. No.: 14/180,290

(22) Filed: Feb. 13, 2014

Related U.S. Application Data

(60) Provisional application No. 61/921,879, filed on Dec. 30, 2013.

(51) Int. Cl.
*G06F 3/00* (2006.01)
*G06F 9/54* (2006.01)

(52) U.S. Cl.
CPC .................................. *G06F 9/542* (2013.01)

(58) Field of Classification Search
CPC .................................. G06F 9/542; G06F 9/52
USPC ........................................................ 719/310
See application file for complete search history.

(56) References Cited

U.S. PATENT DOCUMENTS

| | | | | |
|---|---|---|---|---|
| 7,581,011 | B2* | 8/2009 | Teng | 709/229 |
| 8,078,487 | B2* | 12/2011 | Li et al. | 705/7.22 |
| 8,284,423 | B2* | 10/2012 | Jahn et al. | 358/1.15 |
| 2005/0043965 | A1* | 2/2005 | Heller | G06F 19/326 705/2 |
| 2009/0048868 | A1* | 2/2009 | Portnoy | G06Q 10/06316 705/2 |
| 2009/0083759 | A1* | 3/2009 | Keil et al. | 719/313 |
| 2012/0059669 | A1* | 3/2012 | Whittenburg | G06F 19/00 705/3 |
| 2013/0138466 | A1* | 5/2013 | Kahle | G06Q 10/063114 705/7.15 |
| 2014/0019159 | A1* | 1/2014 | Singh | G06Q 10/103 705/3 |
| 2014/0272860 | A1* | 9/2014 | Peterson et al. | 434/262 |

OTHER PUBLICATIONS

Gunther Schadow, Conceptual alignment of electronic health record data with guideline and workflow knowledge, 2001.*

* cited by examiner

*Primary Examiner* — Lechi Truong
(74) *Attorney, Agent, or Firm* — Knobbe Martens Olson & Bear LLP

(57) ABSTRACT

Generally described, aspects of the present disclosure relate to the management of event data. In one aspect, an event management service obtains information related to one or more events and implements steps related to the collection of event data. In another aspect, based on the collected information, the event management service can implement one or more event data management protocols. For example, the event management service can track the progression of data analysis related to the event data, such as implementing various error analysis tools or methodologies. In another example, the event management service can implementing tracking methodologies that can determine when to implement various escalations or follow up actions based on the processing of event data. In still a further aspect, the event management service can implement various reporting or auditing related to the collection of the event data, the processing of the event data or both.

21 Claims, 5 Drawing Sheets

EVENT MANAGEMENT ARCHITECTURE

CROSS-REFERENCE TO RELATED APPLICATION

This application claims the benefit of U.S. Provisional Patent Application No. 61/921,879, entitled EVENT MANAGEMENT ARCHITECTURE, and filed Dec. 30, 2013, the entirety of which is incorporated herein by reference.

BACKGROUND

Generally described, healthcare organizations are required to implement event management protocols related to tracking and managing events. Often, aspects of event management protocols may be specified by various governmental or management authorities with regard to the type of information collected as part of an event or as to how event information is processed. Additionally, an organization may utilize different methodologies for analyzing event data, which may require different event data or different forms of collected event data.

Many approaches to event management relate to the individual collection and processing of event data. In some instances, a healthcare organization may be required to collect event data multiple times depending on the implementation of different event management protocols or even utilizing different analysis tools as part of the same event management protocol. Such methodologies may be inefficient and subject to data entry errors.

BRIEF DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

Generally described, aspects of the present disclosure relate to the management of event data. Specifically, systems and methods are disclosed which the collection of event data related to operation of an organization, such as healthcare organizations. In one aspect, an event management service obtains information related to one or more events and implements steps related to the collection of event data. In another aspect, based on the collected information, the event management service can implement one or more event data management protocols. For example, the event management service can track the progression of data analysis related to the event data, such as implementing various error analysis tools or methodologies. In another example, the event management service can implement tracking methodologies that can determine when to implement various escalations or follow up actions based on the processing of event data. In still a further aspect, the event management service can implement various reporting or auditing related to the collection of the event data, the processing of the event data or both.

Although the present application will be described with regard to the management of event data related to healthcare organizations, including several illustrative healthcare event data management protocols, one skilled in the relevant art will appreciate that the disclosed examples are illustrative in nature and should not be construed as limiting.

Figure 1:
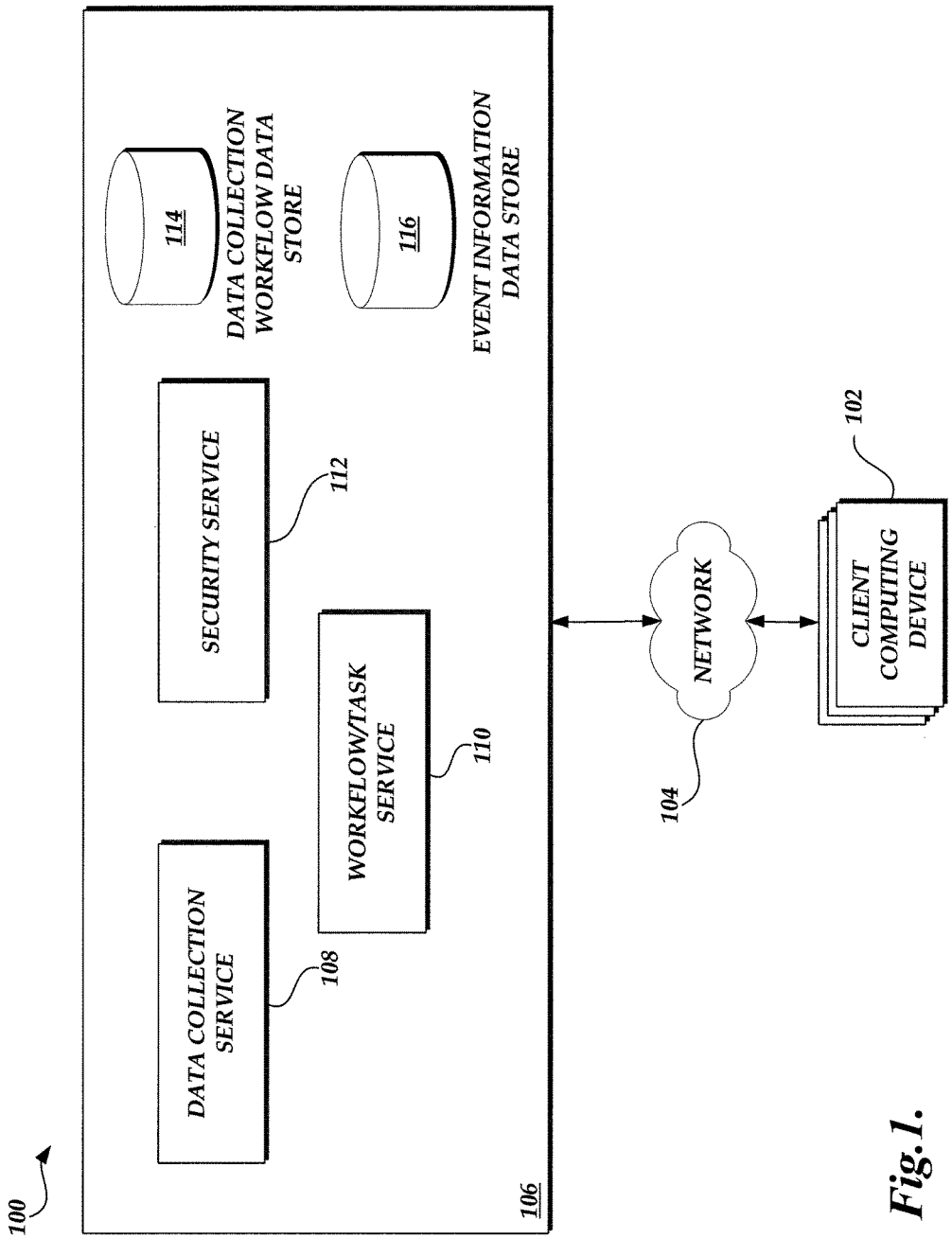
FIG. 1 is a block diagram illustrating an embodiment of a virtual network having physical computing devices including hosted virtual machine instances and a migration management service.

FIG. 1 is a block diagram illustrating an embodiment 100 of a network including an event management service 106. As will be described in greater detail below, the event management service 106 includes a variety of computing devices, implementing functionality associated with the event management service. In one aspect, the event management service 106 functions to configure and collect event data. Illustratively, event data corresponds to various information associated with an identified event. By way of example, event data can correspond to incident data associated with services provided by a healthcare organization. Accordingly, in this illustrative embodiment, the event management service 106 functions to configure and collect event data related to incidents associated with healthcare organizations. Still further, in this illustrative embodiment, the event management service 106 can collect event data to facilitate the processing of the event data by more than one data processing methodology. In another aspect, the event management service 106 functions to process the collected event data. Illustratively, the processing of the collected event data can include the application of various data processing methodologies. Additionally, the processing of the collected data can include the implementation of feedback or escalation methodologies for additional implementation. In still a further aspect, the event management service 106 can function to transmits or otherwise publish the processing event data.

With continued reference to FIG. 1, various components of the migration event management service 106 will be described. Illustratively, the event management service 106 may be associated with computing resources such as central processing units and architectures, memory (e.g., RAM), mass storage or persistent memory, graphics processing units, communication network availability and bandwidth, etc. Generally, however, the event management service 106 may include one or more hardware processing units, such as one or more CPUs having logical circuitry for executing computer-executable commands. The event management service 106 may also include system memory, which may correspond to any combination of volatile and/or non-volatile storage mechanisms. The system memory may store information that provides an operating system component, various program modules, program data, or other components. The event management service 106 performs functions by using the processing unit(s) to execute instructions provided by the system memory. The event management service 106 may also include one or more types of removable storage and one or more types of non-removable storage. Still further, the event management service 106 can include communication components for facilitating communication via wired and wireless communication networks, such as communication network 104.

Illustratively, the event management service 106 can include or provide, among other hardware or software components, a data collection service 108, a task/workflow service 110, and a security service 112. In one aspect, the data collection service 108 is operable, at least in part, to implement data collection workflows for the collection of event data. As previously described, in one embodiment, the data collection service 108 can facilitate the collection of event data in a manner to support multiple data processing methodologies that would be applied subsequent to the collection of the event data. In another aspect, the task/workflow service 110 is operable, at least in part, to implement data processing methodologies for processing collected event. In still a further aspect, the security service 112 is operable, at least in part, to implement various security protocols related to the collection of event data, processing of event data or maintenance of event data on the event management service 106.

The event management service 106 can further include a data collection workflow data store 114 for maintaining information related to the implementation of data collection workflows. The event management service 106 can also include an event information data store 116 for maintain collected and processed event data. Although the data collection workflow data store 114 and the event information data store 116 are depicted in FIG. 1 as single data stores, one skilled in the relevant art will appreciate that the each of the data stores may be implemented by any number of computing devices having data maintenance functionality. Additionally, the data stores may distributed in a manner to be remote from other computing devices associated with the event management service 106. Accordingly, the depiction of the data stores is illustrative and logical in nature.

In communication with the event management service 106 via a communication network 104 are one or more client computing devices 102. Illustratively, the client computing devices 102 correspond to any one of a variety of computing devices, such as desktop computing devices, mobile devices, tablet devices, embedded devices, and the like, that are configured to interact with one or more of the hosted virtual machine instances via the communication network 104. By way of example, the communication network 104 may be, for instance, a wide area network (WAN), a local area network (LAN), or a global communications network.

Figure 2A:
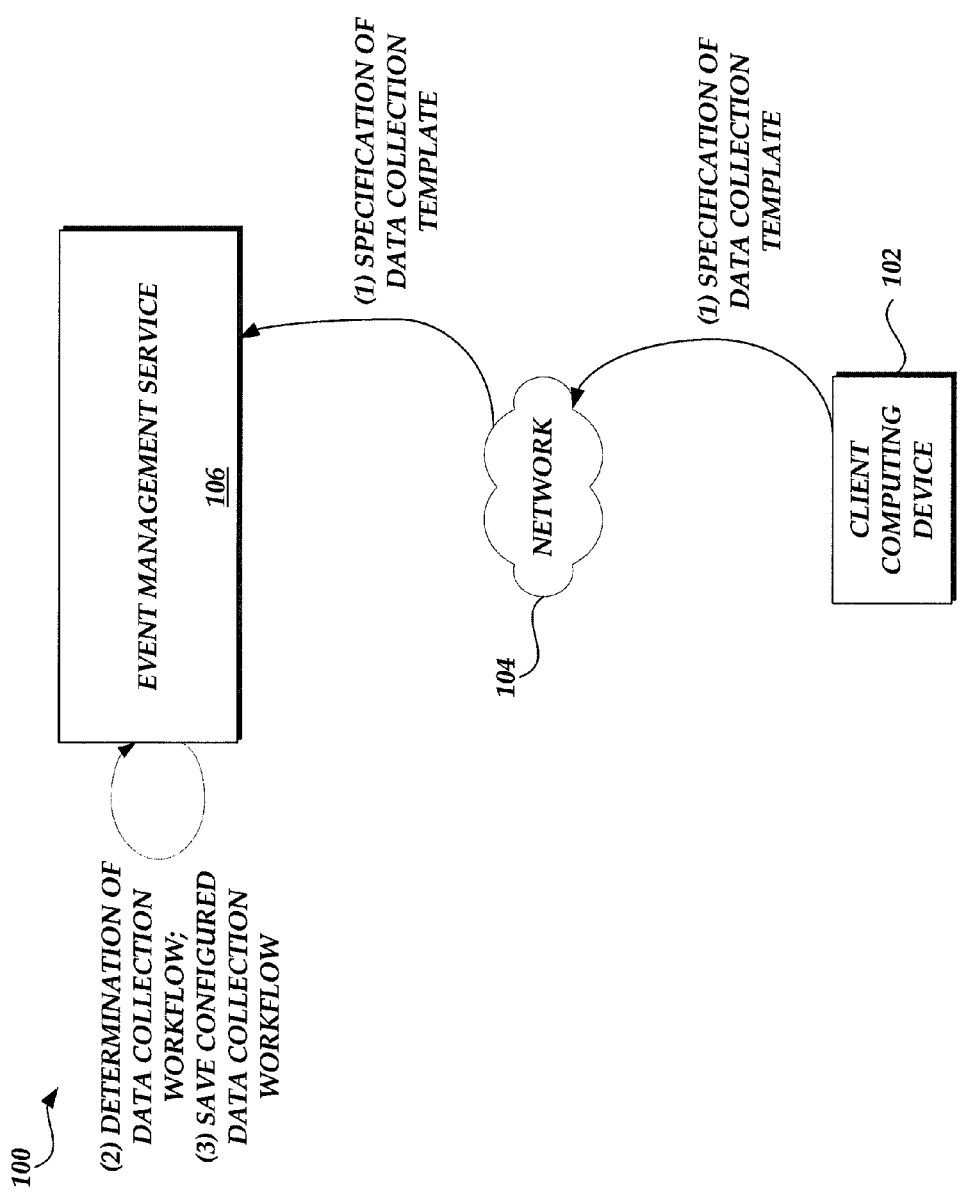
FIGS. 2A-2B are simplified block diagram of the network of FIG. 1 illustrating the configuration of data collection workflows and data processing methodologies based on data collection templates.
Figure 2B:
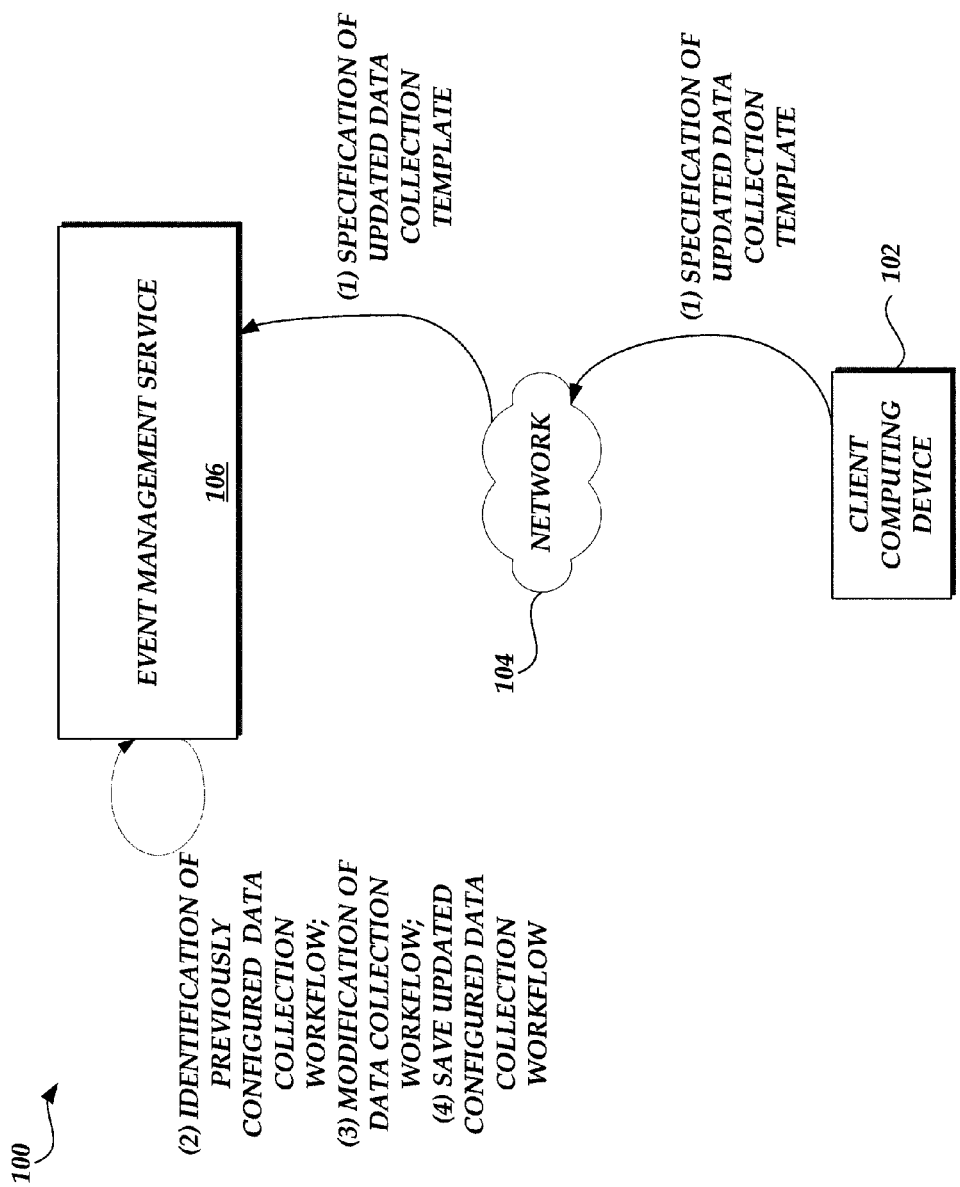

With reference now to FIGS. 2A-2B, simplified block diagrams are shown illustrating the process of configuring the event management service 106 for the collection of event data. As illustrated in FIG. 2A, at (1), a client computing device 102 can specify event collection by selection of an event data collection template. Illustratively, the event data template can identify various types of event data that will be collected by selection of an event type. The event data template can also identify one or more data collection workflows that will be used by the event management service 106 to collect information from client computing devices 102. For example, the data collection workflows can define logical steps utilized by the event management service 106 to identify event data of interest. The event data template can also specify the data processing methodologies that will be implemented by the event management service 106 on the collected data and the timing associated with the implementation of the data processing methodologies. In one embodiment, a user may select from a set of predefined data collection templates. For example, a user may be presented with a graphical user interface that presents a data collection template or data processing methodology to a user, such as a list view, drop down menu, and the like. In another embodiment, a user may be able to configure a data collection template or modify pre-existing data collection templates.

At (2), the event management service 106 determines one or more data collection workflows based on the selected data collection template. The event management service 106 can utilize a specified data collection workflow identified in the data collection template. In another embodiment, the event management service 106 can identify the event data that is to be collected and generate data collection workflows based on the identified event data to be collected. For example, in this embodiment, the event management service 106 can identify how many data processing methodologies will be supported and instantiate the collection of the event data corresponding to the determination. In still a further embodiment, the selection of the data collection template can include declarative information that can be used as the basis for generating the data collection workflows. At (3), the event management service 106 stores the identified or generated data collection workflows for subsequent implementation.

Turning now to FIG. 2B, in some embodiments, previously specified data collection templates may be updated or modified. As illustrated in FIG. 2B, at (1), a client computing device 102 can specify a modification to a previously configured event collection by selection of an updated event data collection template. As previously described, the event data template can identify various types of event data that will be collected by selection of an event type. The event data template can also identify one or more data collection workflows that will be used by the event management service 106 to collect information from client computing devices 102. For example, the data collection workflows can define logical steps utilized by the event management service 106 to identify event data of interest. The event data template can also specify the data processing methodologies that will be implemented by the event management service 106 on the collected data and the timing associated with the implementation of the data processing methodologies. Illustratively, the user can specify new or additional aspects of the data collection template.

At (2), the event management service 106 determines one or more data collection workflows based on the selected and updated data collection template. The event management service 106 can utilize a specified data collection workflow identified in the data collection template. In another embodiment, the event management service 106 can identify the event data that is to be collected and generate data collection workflows based on the identified event data to be collected. In still a further embodiment, the selection of the data collection template can include declarative information that can be used as the basis for generating the data collection workflows. At (3), the event management service 106 then modifies the selected data collection workflow based on the updated data collection template information. For example, the event management service 106 can update logic or replace logic implemented by the data collection workflow. At (4), the event management service 106 stores the identified or generated data collection workflows for subsequent implementation.

Figure 3:
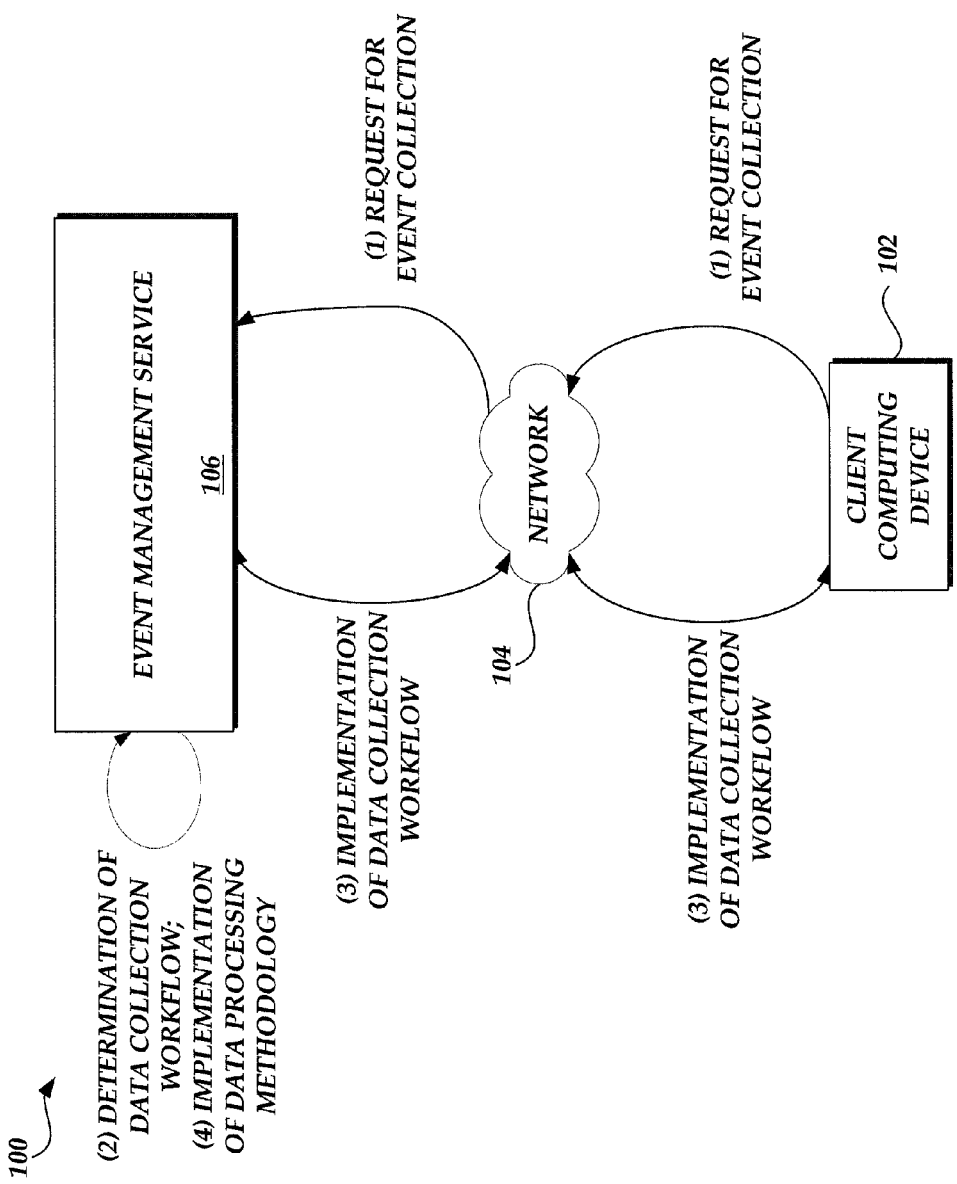
FIG. 3 is a simplified block diagram of the network of FIG. 1 illustrating the collection and processing of event data by an event management service.

With reference now to FIG. 3, a simplified block diagram are shown illustrating the process of implementing the collection and processing of event data by the event management service 106. At (1), a client computing device 102 can request event collection by transmission of a request to collect event data or request to process an event. At (2), the event management service 106 determines, or identifies, a data collection workflow specified for the event request.

At (3), the event management service 106 implements, or causes to be implemented, the data collection workflow. As previously described, illustratively, the implementation of the data collection workflow can include the execution of data logic for the purpose of collecting data that will be utilized in data processing methodologies. The data collection workflow can be characterized as a set of logic steps that may be modified or edited based on the type of event data or changes in specified data processing methodologies. In one embodiment, the execution of the data collection workflow can be implemented in the presentation of various questions or prompts presented on the client computing device 102. Based on the information provided at each step, the event management service 106 can utilize the logic steps to determine whether additional information is required or if previously submitted information should be modified.

In some embodiments, various data processing methodologies may be implemented based on an event. In these embodiments, the data collection workflow may include combined logic to collect information for all the anticipated or possible data processing methodologies. In these embodiments, the combined logic may allow for a single collection of event data or a reduced number of collections for the event data. Still further, in some embodiments, the data collection workflow may be modified or updated during the collection of the event data. In these embodiments, the logic steps for the collection of event data can be updated or implemented in a way to achieve the update.

With continued reference to FIG. 3, at (4), the event management service 106 identifies one or more applicable data processing methodologies to apply to the collected data. In one illustrative embodiment, the event management service 106 can implement established methodologies for determining information about event, such as root cause analysis data processing methodologies. In the context of health care organizations managing event data, illustrative examples of such root cause analysis data processing methodologies include, but are not limited to, the London Protocol, VA Protocol, SRX System protocol, and Mayo Protocol. In another embodiment, the event management service 106 may be configured to blend multiple data processing methodologies or implement multiple data processing methodologies in parallel.

Still further, the event management service 106 may be configured to implement various pattern matching or statistical processing methodologies to provide qualitative analysis of the collected event data. For example, the event management service 106 can utilize previously determined behavior patterns to identify specific event data of interest or to characterize the quality of event data. In this example, the event management service 106 can be trained or configured with behavior data that identifies specific attributes, patterns, etc. indicative of quality, etc.

In another aspect, the event management service 106 can implement the data processing methodologies to determine when an event should be considered complete or finished. By way of example, regulations or procedures may specify how specific events (e.g., such as a medical prescription error) should be handled. In this example, the data collection workflow may attempt to collect information about the initial event and any follow up that has occurred (or will occur). Accordingly, the data processing methodology may be configured to not only determine whether the event occurred or factors related to the event, but to determine whether the appropriate follow up actions have been completed. If so, the event management service 106 can determine the event to be "completed." Additionally, if an event is not completed, the data processing methodologies can also specify actions that the event management service 106 can subsequently implement to escalate the event. For example, the event management service 106 can transmit notifications or collect additional information in the situation that an event cannot be closed or is not closed within a specified time.

Figure 4:
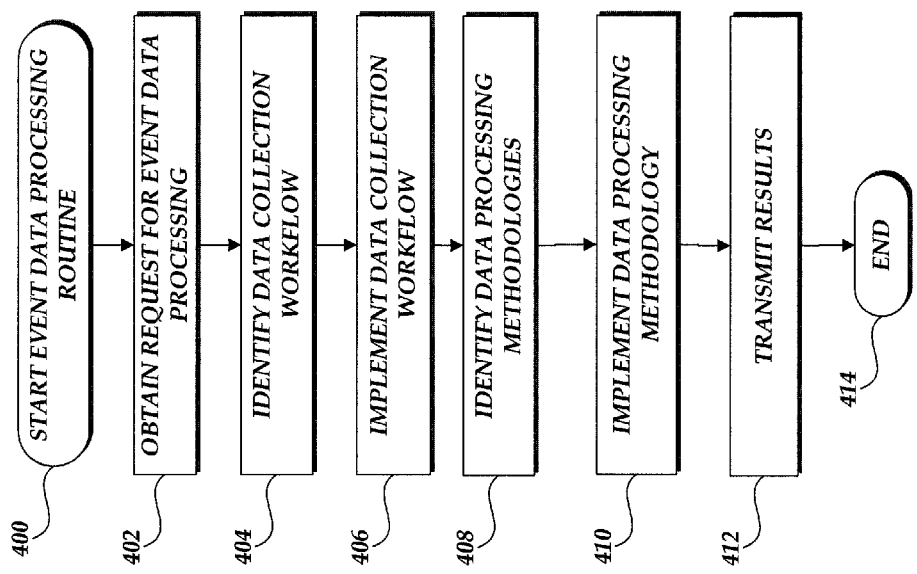
FIG. 4 is a flow-diagram illustrating an event data processing routine implemented by an event management service.

With reference now to FIG. 4, an illustrative flow-diagram depicting a routine 400 for the management of event data is depicted. This routine may be carried out by, for example, by one or more services associated with the event management service 106 of FIG. 1. At block 402, the event management service 106 obtains a request for event collection by transmission of a request to collect event data or request to process an event. Illustratively, the request for event collection may be transmitted by the client computing device 102. Alternatively, the request for event collection may be transmitted by a third party service, such as a government agency or management service. Still further, in other embodiments, the request for event collection may be determined inferentially based on information obtained by the event management service 106. For example, the event management service 106 can obtain information indicative of an event, such as requests for identified services (e.g., emergency personnel), communications to specific individuals or entities (e.g., safety officers, insurance companies), and the like.

At block 404, the event management service 106 determines, or identifies, a data collection workflow specified for the event request. As previously described, the data collection workflow may be previously configured by a user or system administrator based on a determine data collection template. In other embodiments, the data workflow may be defined as part of the request and not previously configured.

At block 406, the event management service 106 implements, or causes to be implemented, the data collection workflow. As previously described, the implementation of the data collection workflow can include the execution of data logic for the purpose of collecting data that will be utilized in data processing methodologies. In some embodiments, the event management service 106 may be configured to collect event data corresponding to more than one data processing methodology. In other embodiments, the event management service may also prioritize portions of the data collection workflow to prioritize portions of the event data that are collected.

The data collection workflow can characterized as a set of logic steps that may be modified or edited based on the type of event data or changes in specified data processing methodologies. In one embodiment, the execution of the data collection workflow can be implemented in the presentation of various questions or prompts presented on the client computing device 102. Based on the information provided at each step, the event management service 106 can utilize the logic steps to determine whether additional information is required or if previously submitted information should be modified. Although block 406 is described with regard to a single implementation of a data collection workflow, one skilled in the relevant art will appreciate that the implementation of the data collection workflow may be implemented in discrete portions. Additionally, the implementation of such portions of the data collection workflow may be defined according to previous portions or according to time restrictions. Such definitions can control how the event information is obtained.

At block 408, the event management service 106 identifies one or more applicable data processing methodologies to implement to the collected data and implements the identified data processing methodologies at block 410. In one illustrative embodiment, the event management service 106 can implement established methodologies for determining information about one or more events, such as root cause analysis data processing methodologies. In another embodiment, the event management service 106 may be configured to blend multiple data processing methodologies or implement multiple data processing methodologies in parallel. As previously described, the event management service 106 may also be configured to implement various pattern matching or statistical processing methodologies to provide qualitative analysis of the collected event data.

In another aspect, the event management service 106 can implement the data processing methodologies to determine when an event should be considered complete or finished. By way of example, regulations or procedures may specify how specific events (e.g., such as a medical prescription error) should be handled. In this example, the data collection workflow may attempt to collect information about the initial event and any follow up that has occurred (or will occur). Accordingly, the data processing methodology may be configured to not only determine whether the event occurred or factors related to the event, but to determine whether the appropriate follow up actions have been completed. If so, the event management service 106 can determine the event to be "completed." Additionally, in the event that an event is not completed, the data processing methodologies can also specify actions that the event management service 106 can subsequently implement to escalate the event. For example, the event management service 106 can transmit notifications or collect additional information in the situation that an event cannot be closed or is not closed within a specified time.

At block 412, the event management service 106 can then transmit results of the processing of the collected event data. In one aspect, the transmission of the results of the processed collected event data can include notification to one or more users related to the determined attributes, such as causes, related to the events. In another aspect, the transmission of the results can include notification to one or more users related to an escalation or request for additional information. In still a further aspect, the transmission of the results can include controls for requesting audits, etc. At block 414, the routine 400 terminates.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms, and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method for managing event data, the method comprising:
    obtaining a specification of a data collection template, wherein obtaining the specification of the data collection template includes obtaining a selection from a set of available data collection templates, wherein the data collection template specifies a set of user inputs to be collected based on a determination of an event, the event characterized by performance of a health care service provider and the set of user inputs defined according to aspects of the performance of the health care service provider;
    determining one or more data collection workflows based at least in part on the specified data collection template;
    causing implementation of the one or more data collection workflows to collect event data obtained from the set of user inputs via an interface;
    causing implementation of one or more data processing methodologies on the event data collected from the implementation of the one or more data collection workflows;
    determining a result based at least in part on the implementation of the one or more data processing methodologies;
    determining, based at least in part on the result, whether the event is completed; and
    in response to a determination that the event is completed, transmitting the result.

2. The computer-implemented method as recited in claim 1, wherein the one or more data collection workflows are defined in terms of logic steps based on an associated data processing methodology.

3. The computer-implemented method as recited in claim 1, wherein the one or more data processing methodologies include implementation of a root cause analysis data processing methodology.

4. The computer-implemented method as recited in claim 1 further comprising:
    obtaining a specification of an updated data collection template; and
    causing implementation of one or more data collection workflows based on the updated data collection template.

5. The computer-implemented method as recited in claim 1 further comprising obtaining a selection of one or more additional data processing methodologies.

6. The computer-implemented method as recited in claim 1, wherein causing implementation of one or more data processing methodologies on data collected from the implementation of the one or more data collection workflows includes causing implementation of at least one escalation related to the one or more data processing methodologies.

7. The computer-implemented method as recited in claim 1, wherein determining whether the event is completed comprises determining whether a follow-up action is completed.

8. A computer-implemented method for managing event data comprising:
   obtaining a request for event management, wherein obtaining the request for event management includes obtaining a specification of a data collection template, and wherein obtaining the specification of the data collection template includes obtaining a selection from a set of available data collection templates;
   determining one or more data collection workflows based on the selected data collection template associated with the request for event management, wherein the data collection template specifies a set of user inputs to be collected based on a determination of an event, the event characterized by performance of a health care service provider and the set of user inputs defined according to aspects of the performance of the health care service provider;
   causing implementation of the one or more data collection workflows to collect event data obtained from the specified set of user inputs via an interface;
   causing implementation of one or more data processing methodologies on the event data collected from the implementation of the one or more data collection workflows; and
   determining, based at least in part on the implementation of the one or more data processing methodologies on the event data collected from the implementation of the one or more data collection workflows, whether the event is completed.

9. The computer-implemented method as recited in claim 8 further comprising obtaining a specification of the selected data collection template.

10. The computer-implemented method as recited in claim 8, wherein the one or more data collection workflows are defined in terms of logic steps based on an associated data processing methodology.

11. The computer-implemented method as recited in claim 8, wherein the one or more data processing methodologies include implementation of a root cause analysis data processing methodology.

12. The computer-implemented method as recited in claim 8 further comprising:
   obtaining a specification of an updated data collection template; and
   causing implementation of one or more data collection workflows based on the updated data collection template.

13. The computer-implemented method as recited in claim 8 further comprising obtaining a selection of one or more additional data processing methodologies.

14. The computer-implemented method as recited in claim 8 further comprising, in response to a determination that the event is not completed, causing implementation of at least one escalation related to the one or more data processing methodologies.

15. A system for managing event data comprising:
   one or more data stores, implemented by a hardware computing device, operable for maintaining event data and data collection template information; and
   a hardware computing device, having a processor and a memory, wherein the hardware computing device is configured to execute computer-executable instructions that cause the hardware computing device to:
      obtain a request for event management, wherein obtaining a request for event management comprises obtaining a specification of a data collection template, and wherein obtaining the specification of the data collection template includes obtaining a selection from a set of available data collection templates;
      determine one or more data collection workflows based on the specified data collection template, the specified data collection template determined based at least in part on the request for event management, wherein the data collection template specifies a set of user inputs to be collected based on a determination of an event, the event characterized by performance of a health care service provider and the set of user inputs defined according to aspects of the performance of the health care service provider;
      implement the one or more data collection workflows to collect event data obtained from the set of user inputs via an interface;
      implement one or more data processing methodologies on the event data collected from the implementation of the one or more data collection workflows; and
      determine, based at least in part on the implementation of the one or more data processing methodologies on the event data collected from the implementation of the one or more data collection workflows, whether the event is completed.

16. The system as recited in claim 15, wherein the one or more data processing methodologies include at least one of the London Protocol, the VA Protocol, the SRX System protocol, and the Mayo Protocol.

17. The system as recited in claim 15, wherein the one or more data collection workflows are defined in terms of logic steps based on an associated data processing methodology.

18. The system as recited in claim 15, wherein the one or more data processing methodologies include implementation of a root cause analysis data processing methodology.

19. The system as recited in claim 15, wherein the hardware computing device is further operable to:
   obtain a specification of an updated data collection template; and
   implement one or more data collection workflows based on the updated data collection template.

20. The system as recited in claim 15, wherein the hardware computing device is further operable to implement at least one escalation related to the one or more data processing methodologies in response to a determination that the event is not completed.

21. The computer-implemented method as recited in claim 1, wherein the one or more data processing methodologies include at least one of the London Protocol, the VA Protocol, the SRX System protocol, and the Mayo Protocol.

* * * * *